United States Patent
Rijnders et al.

(10) Patent No.: US 9,887,906 B2
(45) Date of Patent: Feb. 6, 2018

(54) NETWORK SERVICE RESTORATION-ON-DEMAND

(71) Applicant: Verizon Patent and Licensing Inc., Arlington, VA (US)

(72) Inventors: Jan Marcel Rijnders, Leiden (NL); Ashley Dickenson, Raleigh, NC (US); Michelle L. Opitz, Cary, NC (US); Eric Duane Culpepper, Murfreesboro, TN (US); Anthony S. Tutwiler, Cary, NC (US); Richard M. Cooper, Colorado Springs, CO (US); Thomas Edward Sibrizzi, Raleigh, NC (US); Christopher A. Kimm, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 208 days.

(21) Appl. No.: 14/486,243

(22) Filed: Sep. 15, 2014

(65) Prior Publication Data
US 2016/0080248 A1 Mar. 17, 2016

(51) Int. Cl.
| | |
|---|---|
| *G06F 15/173* | (2006.01) |
| *H04L 12/707* | (2013.01) |
| *H04W 4/00* | (2009.01) |
| *H04L 29/08* | (2006.01) |
| *H04L 29/14* | (2006.01) |
| *H04L 12/24* | (2006.01) |
| *H04L 12/26* | (2006.01) |

(52) U.S. Cl.
CPC .......... *H04L 45/22* (2013.01); *H04L 41/5009* (2013.01); *H04L 41/5019* (2013.01); *H04L 67/141* (2013.01); *H04L 69/40* (2013.01); *H04W 4/005* (2013.01); *H04L 41/5029* (2013.01); *H04L 43/10* (2013.01)

(58) Field of Classification Search
CPC .............................. H04L 67/141; H04L 69/40
See application file for complete search history.

(56) References Cited

U.S. PATENT DOCUMENTS

| | | | | |
|---|---|---|---|---|
| 6,560,234 B1 * | 5/2003 | Ben-Michael | ...... | H04L 12/2801 370/401 |
| 6,704,289 B1 * | 3/2004 | D'Souza | ............. | H04L 41/0896 370/242 |
| 2003/0154123 A1 * | 8/2003 | Subbloie | .......... | G06Q 10/06375 705/7.35 |
| 2003/0165229 A1 * | 9/2003 | Emley | .................... | H04M 1/723 379/230 |
| 2005/0174935 A1 * | 8/2005 | Segel | ...................... | H04L 45/22 370/228 |
| 2007/0025256 A1 * | 2/2007 | Hertoghs | ............ | H04L 12/4633 370/236.2 |

(Continued)

*Primary Examiner* — Dhairya A Patel

(57) ABSTRACT

A method of establishing a first network connection of a wired network with a customer premise equipment (CPE) installed at a customer premise (CP). The method monitors the first network connection and detects an outage of the first network connection. The method provides an option of using a second network connection of a wireless network, for delivery of services during the first outage of the first network connection. The method receives a response, and switches the delivery of services, via a machine to machine (M2M) interface in the CPE, to the second network connection.

20 Claims, 7 Drawing Sheets

(56) References Cited

U.S. PATENT DOCUMENTS

| | | | |
|---|---|---|---|
| 2008/0231114 A1* | 9/2008 | Tolnar | H02J 3/14 307/38 |
| 2013/0155842 A1* | 6/2013 | Moore | H04W 76/027 370/221 |
| 2014/0177430 A1* | 6/2014 | Hassett | H04L 41/0609 370/216 |

* cited by examiner

NETWORK SERVICE RESTORATION-ON-DEMAND

BACKGROUND

Modern communication systems involve a delicate interplay of network components that support services such as voice and data. These systems are vital to business operations, such that downtime imposes a significant cost to the business. Ensuring that networks are performing to their architected availability at a customer premise (CP), delivering network services at the CP according to the service level agreement (SLA), and mitigating the risk of downtime are the major priorities of a network service provider. Moreover, the impact of network failures, including very minor ones lasting only minute, can be measured in thousands or even millions of dollars. As such, the ability to quickly identify network connection faults and restore network connectivity are critical to helping companies meet and exceed their business objectives.

Consequently, providing an automatic fail over service with a backup network connection at the CP, during a primary network outage, stemming from natural calamities, network component failure, cable cuts are needed.

DETAILED DESCRIPTION OF PREFERRED EMBODIMENTS

Figure 1:
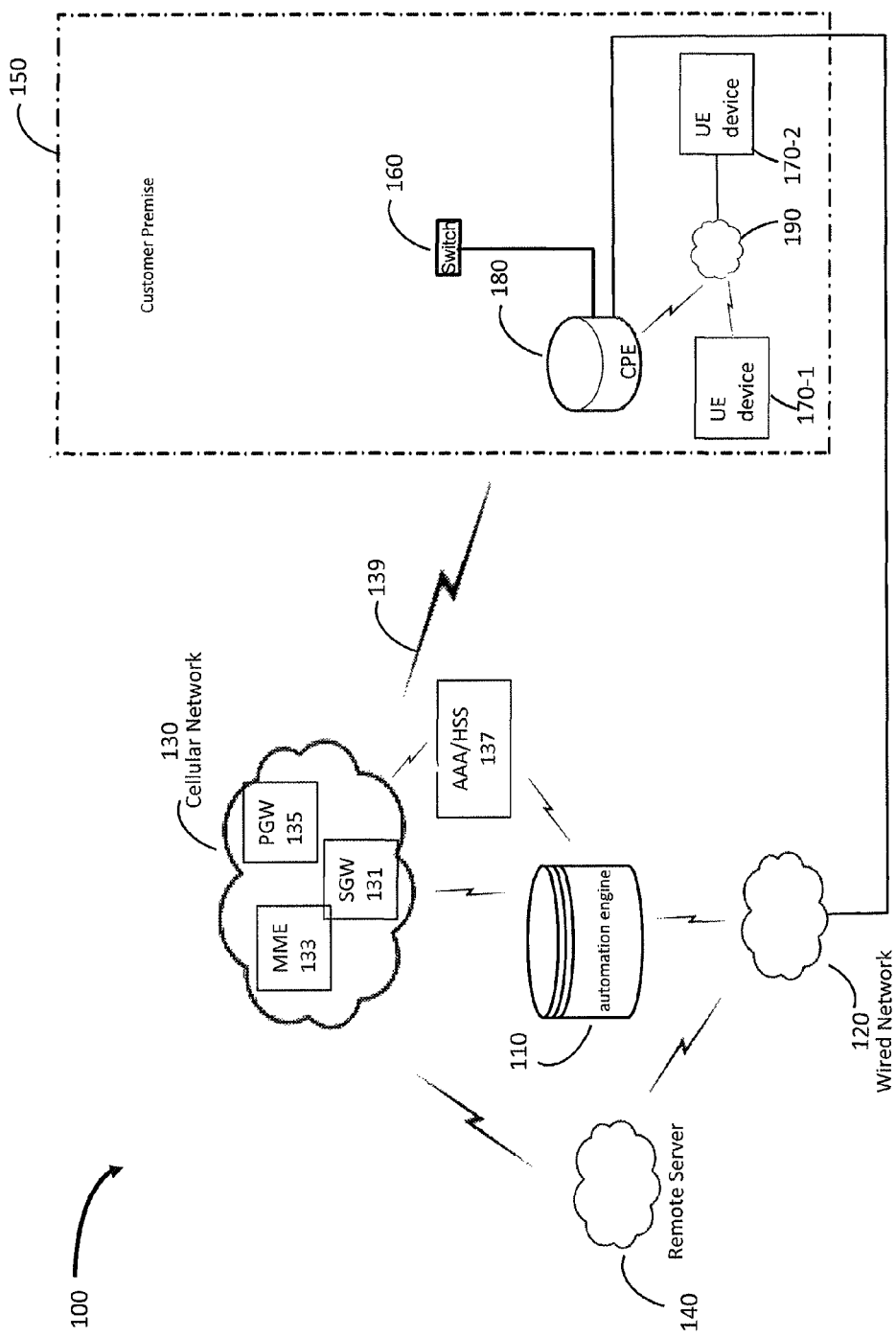
FIG. 1 is a diagram of an example environment in which systems and/or methods described herein may be implemented.

The following detailed description refers to the accompanying drawings. The same labels and/or reference numbers in different drawings may identify the same or similar elements. Also, the following detailed description does not limit the invention.

In one or more implementations, devices may be used to control the delivery of services at a customer premise via a customer premise equipment (CPE) using wired or cellular network.

The term "delivery of services," or "service delivery" as used herein, is to be broadly interpreted to include data flow from a remote server to a CPE via a wired or a cellular network. The delivery of services may comprise delivery of compressed, uncompressed and/or encoded audio data, compressed, uncompressed and/or encoded video data, or other multimedia data, and may also include text, program code, data files, etc. The delivery of services on a wired network may be between an enterprise and its cloud servers via a high-speed link such as a T-carrier or E-carrier electrical service over a wired network or a Sonet or other optical data service over an optical network. In another example, delivery of services may be over optical Ethernet and/or another optical or electrical wired network connection that may utilize cable network or telecom connections such as an Ethernet RJ45/Category 5 connection, a fiber connection, a traditional phone wire-line connection, or another wired network connection. Alternatively, the delivery of services may be between a consumer and a cable television carrier, offering Internet services via an electrical or optical cable television connection.

Within a cellular network for example, Long Term Evolution (LTE) network, delivery of services may permit data flow from a server or a group of servers through one or more wireless nodes, for example, one or more evolved node Bs (enBs) to serving devices such as, network devices, user devices without traversing higher layers of the LTE network. It will be appreciated, however, that delivery of services may be applicable to networks other than LTE. In this regard, the term "network," as used herein, is intended to be broadly interpreted to include a wired or cellular network, for example, mobile network, cellular network and non-cellular network. By way of example, but not limited thereto, delivery of services on a cellular network may be performed in a variety of network types, such as, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, an Evolution Data Optimized (EV-DO) network, and/or another type of cellular network.

Depending on the type of network, service delivery may be performed by wireless nodes not specifically described herein that provide corresponding functionality. By way of example, delivery of service content may be performed by a base station (BS), a base station controller (BSC), an eNB, a network access device, a serving GPRS support node (SGSN), etc.

Wired network may include a local area network (LAN), a wide area network (WAN), a metropolitan area network (MAN), a telephone network, such as the Public Switched Telephone Network (PSTN), an intranet or a combination of networks. In one implementation, a wired network may include a Class 5 domestic switching network that provides services, such as basic dial-tone, calling features, and additional digital and data services to subscribers via local exchange carriers (LECs). In another implementation, the wired network may include other domestic switching networks, such as a Signaling System 7 (SS7) network, an Integrated Services for Digital Network (ISDN) and/or combinations of wired networks.

Although wired network connections are typically very reliable, service outages cannot be avoided. Depending on the geographic location and the service level which has been purchased, a service outage can last for a few hours up to a couple of days. Particularly, for force majeure events such, as floods or storms, the duration of the outage cannot be predicted.

One way to improve the service up-time is to provide redundancy service, for example, a backup cellular and/or a backup wired network connection, to the customer site. During a sales initiation process of a network connection, customers may not be aware of the risks and consequences of relying on a single wired connection. Often, customers consider the extra costs for the redundancy service too high, and therefore, decide to accept the single wired network connection to their sites.

However, the network service provider may provide a solution to those customers who are not willing to contract up-front for network service redundancy. This solution is to allow the customer to purchase restoration-on-demand service, immediately upon the occurrence of a service outage. That is, the customers have the option to continue to use the network services via a dynamically provided redundant network connection even though they have not subscribed to use such a connection. This is beneficial not only for the customers but also for the network service provider because it potentially relieves the burden of rushing the repair of the wired network connection.

The network service provider may deploy the redundancy service at the CP, by implementing Machine to Machine (M2M) technology, in which integrated wireless transmitters/receivers are included in autonomous operating equipment. This is analogous to the way laptop computers are being designed with many interfaces, such as Wi-Fi, memory slots, USB, Firewire, analogue PSTN modem, SATA, RJ45-Ethernet, HDMI, etc.

In some embodiments of this invention, a CPE, such as a set top box, or a network device, for example, a modem or switch, may include an integrated M2M interface that uses wireless service. Restoration-on-demand may be available wirelessly in cases where the M2M interface connects to a wireless access service and provides the customer with services that fulfill the terms and conditions of the SLA. For example, the bandwidth and latency of the M2M connection may be similar to that of the primary wired network service, or at least at a previously agreed-upon lower quality. The M2M interface may be disabled under normal operating conditions when the service is provided by the wired network connection. The CPE that includes the M2M interface, can either be customer owned, or network-operator-owned. When the primary network experiences an outage, the user may receive network services via the network device that includes the M2M interface via the backup cellular network. In another implementation, a user device, itself, such as a laptop, or a mobile device, may include the M2M interface and facilitate the redundant service.

Machine-to-machine (M2M) technologies are becoming more and more important to businesses. Traditionally, many networked M2M communications have utilized the public switched telephone network (PSTN). More recently, M2M communications have begun to use communication services offered by public mobile wireless communication networks. For example, M2M communications may take advantage of deployed cellular networks based on Third Generation Partnership Project (3GPP) technologies such as GSM), UMTS, LTE, and/or other technologies such as those developed by 3GPP2 and the IEEE. The M2M interface may also use other technologies such as WiMAX, fourth-generation (4G) LTE and later-defined wireless data communications standards. As such, M2M may refer to technologies that allow wireless systems to communicate with other devices.

As described below, network operators may employ M2M technologies at a CP to provide customers with restoration-on-demand network services. For example, during a network connection outage, the customer may receive a notification, from an automation engine server, that a trouble ticket has been created for the network outage and the network carrier is working on resolving the issue. As described above, depending on the reason for the outage, this can take a few hours up to a couple of days or even weeks if, for example, a force majeure situation, such as a hurricane or an earthquake has occurred. The automation server may further determine that the customer has not subscribed to an automatic redundancy fail-over service. The automation server may then send a message to the customer asking if he would like to receive restoration service for the site. This could be, for example, offered via a network service provider portal, a Smart-Phone Application that is being used at the customer site, or an email with the appropriate return instructions for the customer to indicate whether he wants to restore his network services. If the customer accepts the offer for restoration-on-demand, the carrier activates a backup cellular service via the M2M interface. The restoration confirmation may be associated with the acceptance of the charges to restore the service. In another example, the backup service may be another wired network connection that is activated by the carrier via another M2M interface. It is contemplated that, the primary network connection may be a cellular and/or a wired network connection and the backup network connection may be another cellular and/or another wired network connection.

With reference to FIG. 1, in one implementation, network environment 100 may include cellular network 130 that operates according to 3G or 4G mobile telecommunications standards. In another implementation, network 130 may be an evolved packet system (EPS) that includes a LTE network and/or an evolved packet core (EPC) that operates based on a 3GPP or 4G wireless communication standard. The LTE network may be a radio access network (RAN) that includes one or more small base stations that take the form of ends. The EPC may include serving gateway (SGW) 131, mobile management entity (MME) 133, and/or packet data network gateway (PGW) 135 that enable user equipment (UE) devices 170 to receive network services (e.g., from remote server 140), using unicast/multicast transmissions, and/or an Internet protocol (IP) multimedia subsystem (IMS) core (not shown).

SGW 131 may include one or more computation or communication devices that gather, process, search, store, and/or provide information in a manner described herein. SGW 131 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 131 may aggregate traffic received from one or more base stations associated with the LTE network, and may send the aggregated traffic to the automation engine server 110 (e.g., via PGW 135) and/or other network devices associated with the EPC. SGW 131 may also receive traffic from the other network devices and/or may send the received traffic to network devices 180 and UE device 170 via base station. SGW 131 may perform operations associated with handing-off UE devices 170 from and/or to other base stations in the LTE network.

MME 133 may include one or more computation or communication devices that gather, process, search, store, and/or provide information in a manner described herein. For example, MME 133 may perform operations associated with handing off UE device 170, from one base station to another. The MME may also interface with the authentication, authorization and accounting (AAA)/home subscriber service (HSS) server 137 to provide authentication, authorization and accounting services for the network 130.

PGW 135 may include one or more computation or communication devices that gather, process, search, store, and/or provide information in a manner described herein. PGW 135 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 135 may include a device that aggregates traffic received from one or more SGWs, and may send the aggregated traffic to automation engine server 110, to other network devices. In another example implementation, PGW 135 may receive traffic from automation engine server 110, and may send the traffic toward other servers and/or one of the network devices 180 via SGW 131.

HSS/AAA server 137 may include one or more devices that gather, process, search, store, and/or provide information in a manner described herein. For example, HSS/AAA server 137 may manage, update, and/or store, in a memory associated with HSS/AAA server, profile information, associated with UE device 180, that identifies applications and/or services that are permitted for and/or accessible by UE device 170; information associated with a user of UE device 170 (e.g., a username, a password, a personal identification number (PIN)); rate information; minutes allowed; and/or other information.

Moreover, HSS/AAA server 137 may gather, process, search, store, and/or provide an SLA related to a user of a CPE. Additionally, or alternatively, HSS/AAA server may perform authentication, authorization, and/or accounting operations associated with a communication session with UE device 170. MME 133 may receive authorization from HSS/AAA server 137, in response to a request from UE device 170, before MME 133 creates and stores a context for UE device 170.

Figure 2:
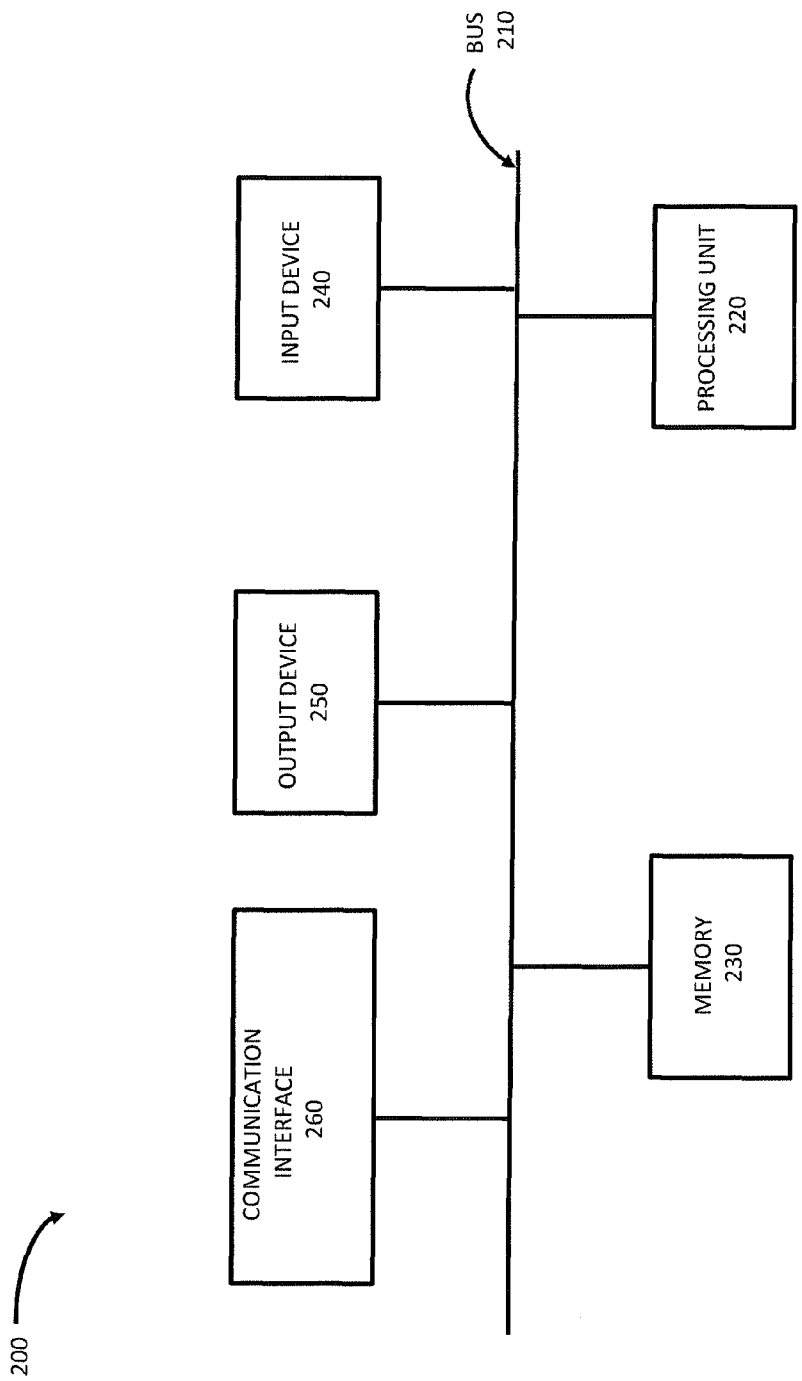
FIG. 2 is a block diagram of example components of a device that may be utilized in the environment of FIG. 1.

FIG. 2 is a diagram of example components of a device 200 according to one or more implementations described herein. In certain implementations, a portion or all of device 200 may correspond to one or more of the devices depicted in FIG. 1. For example, device 200 may correspond to UE device 170, SGW 131, MME 133, PGW 135, AAA/HSS server 137, or automation engine server 110. Additionally, each of UE device 170, SGW 131, MME 133, PGW 135, or automation engine server 110, may include one or more devices 200 or one or more components of device 200 and multiple ones of the UE device 170, SGW 131, MME 133, PGW 135, or automation engine server 110 may be implemented in a single one of the devices 200.

As depicted, device 200 may include bus 210, processor 220, memory 230, input device 240, output device 250 and communication interface 260. However, in other implementations, device 200 may include fewer components, additional components, different components, or differently arranged components than those illustrated in FIG. 2.

Bus 210 may include one or more component subsystems and/or communication paths that enable communication among the components of device 200. Processor 220 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 220 may control the overall operation, or a portion thereof, of device 200, based on, for example, an operating system, and/or various applications. Processor 220 may access instructions from memory 230, from other components of device 200, or from a source external to device 200 (e.g., a network or another device).

Memory 230 may include memory and/or secondary storage. For example, memory 230 may include random access memory (RAM), dynamic RAM (DRAM), read-only memory (ROM), programmable ROM (PROM), flash memory, or some other type of memory. Memory 230 may include a hard disk (e.g., a magnetic disk, an optical disk, a magneto-optic disk, a solid state disk, etc.) or some other type of computer-readable medium, along with a corresponding drive. The memory 230 may include computer-readable medium, defined as a non-transitory memory device. A memory device may include data storage elements within a single physical memory device or be spread across multiple physical memory devices.

Input device 240 may include one or more components that permit a user to input information into device 200. For example, input device 240 may include a touch-screen, keypad, a button, a switch, a knob, fingerprint recognition logic, retinal scan logic, a web cam, voice recognition logic, a touchpad, an input port, a microphone, a display, or some other type of input component. Output device 250 may include one or more components that permit device 200 to output information to a user. For example, output device 250 may include a display, light-emitting diodes (LEDs), an output port, a speaker, or some other type of output component.

Communication interface 260 may include one or more components that permit device 200 to communicate with other devices or networks. For example, communication interface 260 may include some type optical, wireless or wired interface. Communication interface 260 may also include an antenna (or a set of antennas) that permit wireless communication, such as the transmission and reception of radio frequency (RF) signals in accordance with the applicable standard for wireless communications with base stations.

As described herein, device 200 may perform certain operations in response to processor 220 executing software instructions contained in a computer-readable medium, such as memory 230. The software instructions may be read into memory 230 from another computer-readable medium or from another device via communication interface 260. The software instructions contained in memory 230 may cause processor 220 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
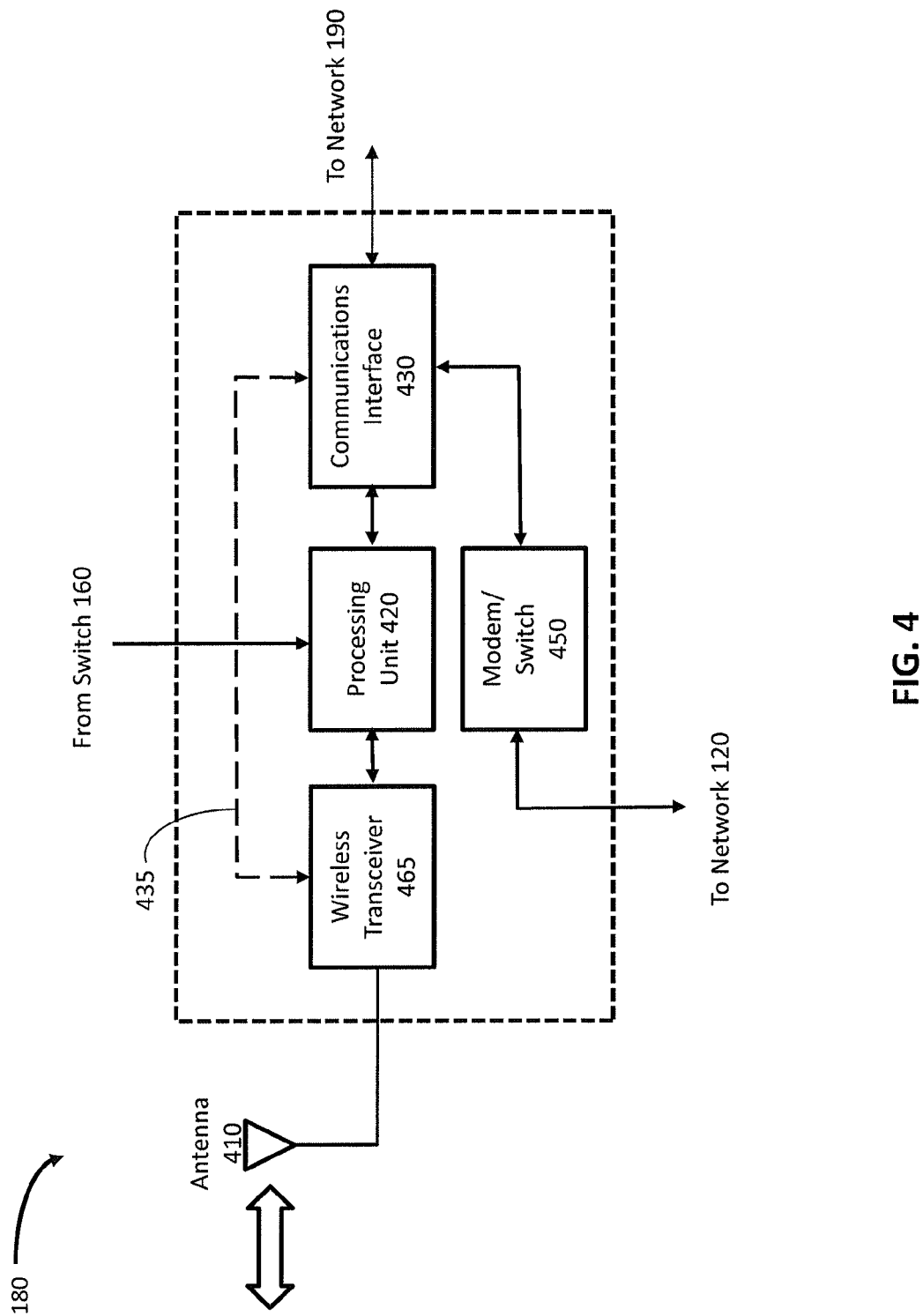
FIG. 4 is a block diagram of example customer premise equipment that may be utilized in the environment of FIG. 1.

With reference to FIG. 1 and FIG. 4, network 100 includes network device or a CPE 180 (referred to collectively herein as network devices or CPEs 180 and individually as network device or CPE 180) that includes a M2M interface, for example, a wireless transceiver 465. The CPE may also include, a processing unit 420, and an antenna 410. The example CPE 180 shown in FIG. 4 also includes a modem or switch 450 that is coupled to the wired network 120 and a communications interface 430 that is coupled to the local network 190 in the customer premises. During normal operation, the CPE 180 provides data communication services to the local network 190 through the communications interface 430. When the wired network 120 experiences an outage, the CPE 180 switches or is switched to decouple the modem/switch 450 from the communications interface 430 and to couple the wireless transceiver 465, as indicated by the dashed line 435.

The transceiver 465 provides two-way wireless communication of information, such as digital message information, in accordance with the technology of the mobile communication network 130. For example, the transceiver 465 sends and receives a variety of signaling messages in support of data services provided via the mobile communication network 130. In this example, the transceiver 465 is configured for RF communication in accord with a digital wireless protocol, such as the 3GPP and LTE (including WIMAX) protocols. Transceiver 465 connects through RF send and receive amplifiers (not separately shown) to its antenna 410. Processing unit 420 processes controls the configuration of the CPE 180 the information and data to be sent and collected by the wireless transceiver.

Although the CPE 180 is shown as including both the modem/switch 450 and the wireless transceiver 465, it is contemplated that it may only include a communications interface 430, processing unit 420 and wireless transceiver 465. In this implementation, the CPE 180 is inactive during normal network operation and is activated during an outage of the wired network 120 to provide data communication services. It is further contemplated that the CP 150 may include two CPEs 180, for example, where one of the CPEs is connected to the cellular network 130 (and includes only the wireless transceiver 465) and the other CPE is connected to the wired network 120.

The network devices 180 are generally at fixed remote locations, for example, at a home or apartment or at a customer premise (CP) such as, commercial/industrial establishment 150. To enable the communication of data for the network devices 180, each such device includes (or is attached to) a wireless transceiver, as described above. Accordingly, each network device provides network access capability, in this example, to the cellular network 130.

In one implementation, CP 150 includes a physical switch 160, coupled to the processing unit 420 of the CPE 180 that allows a user at the CP 150 to manually enable or disable the M2M interface in the CPE 180. The network device 180 may be connected to the switch 160. The switch 160 may be operated by a customer at the CP, during an emergency, for example. To enable communication at the CP, through the cellular communication network 130, the customer may turn on the switch 160, to enable delivery of services via network device 180.

In another implementation, the switch 160 may be integrated with the network device 180. It is contemplated that, the switch may be operated by an operator or a customer for the activation of the restoration-on-demand service, independent of any communication with the UE devices 170.

As described above, wired network 120 may be a wide area network (WAN). For example, network 120 may include broadband access technologies including digital subscriber line (DSL), Fiber Optic Services (FiOS®) (FiOS is a registered trademark of Verizon Communications Inc.) cable that connects UE devices 170 to real-time content services of remote server 140. Alternatively, wired network 120 may include Ethernet over twisted-pair technologies, coaxial cable or Sonet over an optical fiber network, or T-Carrier service for example, over 10BASE-T or 1000BASE-T connections.

In one example, remote server 140 includes a content provider. For example, remote server 140 may include business related content, such as business programs and data for a business or an enterprise. In another example, remote server 140 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., YouTube, Vimeo, Netflix, Hulu, Veoh, etc.) that stream content from web sites and/or permit content to be downloaded at a home of a residential area.

As shown in FIG. 1, the example network environment 100 may include UE devices 170-1, 170-2 (referred to collectively herein as UE devices 170 and individually as UE device 170). UE device 170 may include any computation or communication device, such as a wireless mobile communication device that is capable of communicating with base station and, through the base station with the automation engine server 110. Examples of the UE device 170 include a laptop computer, a tablet computer, desktop computer, local server, radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a camera, a personal gaming system, or another type of computation or communication device including mobile devices. UE device 170 may send traffic to and/or receive traffic from remote server 140 via the wired network 120. The UE devices are programmed with applications (Apps) that access content via wired and/or cellular network. An example UE device 170 may have multiple Apps running at a given time and, thus, may access multiple network services or contents at the same time.

It is contemplated that data communications that flow to and from CPE 180, UE devices 170 at the CP 150 to the automation engine server 110 and/or remote server 140 may traverse different data planes, such as a network control data plane and a user data plane, based on a type of data that is being communicated. For example, data that is related to control functions in the network 100 may traverse the network control data plane. On the other hand, user-related data may traverse the user data plane in the network. In one example, data is communicated over the user data plane, when a user of the UE device 170 at the CP 150 receives data services from the remote server 140 via either the wired network 120 or the cellular network 130. Whereas, data is communicated over the network control data plane, when the automation engine server 110, for example, interrogates or controls the CPE 180 via the wired network connection 120 or the cellular network connection 139.

With reference to FIG. 1, it is further contemplated that the network control data plane may always be enabled for a network connection, however, the user data plane may be disabled initially and enabled at a later time based on user-related traffic. For example, the network control data plane of the cellular network connection 139 may be enabled at all times by the automation engine server 110, so that the automation engine 110 may poll the CPE 180 via the network connection 139. This allows the engine 110 to continually monitor the health of the network connections. The network control data plane may also be used by the automation engine server 110 to send a network outage notification. The user data plane of the network connection 139, however, may only be enabled when the user chooses to receive user services from remote server 140, upon selecting the restoration-on-demand service. Moreover, enabling the user data plane may include setting up a virtual private network or an internet protocol (IP) session within the network. Also, if the user has pre-selected the restoration-on-demand service, it is contemplated that the IP session may be pre-provisioned in the cellular network 130.

As such, it is also contemplated that the M2M interface may be enabled for the network control data plane at all times, however, the M2M interface may be enabled for the user data plane only when there is a provision for user related traffic.

Example CP 150 may also include a local network 190. In one implementation, the local network 190 is a Wi-Fi network. For example, as shown in FIG. 1, the local network 190 may link the UE device 170-1 and other UE devices (not shown) wirelessly. In yet another example, the local network 190 links the UE device 170-2 and other UE devices (not shown) via a wired connection. Local network 190 may receive information from network 120 and/or network 130 via CPE 180. Local network 190 may also provide firewall functionality for CP 150, such as packet filtering and protection against network attacks.

As shown in FIG. 1, the example network environment further includes an automation engine server 110. Automation engine server 110 includes one or more devices that gather, process, search, store, and/or provide information to control network services over wired and cellular networks in a manner similar to that described herein. In one example, Automation engine server 110 may be included in the network of a service provider.

In one example, automation engine server 110 stores software or logic associated with monitoring of the health of network connections, remote network outage detection and restoration. Automation engine server 110 detects, retrieve, and/or processes alerts in order to detect an outage, determine that an outage event has occurred, isolate faults and/or customer site locations associated with an outage, and/or detect when the network connection has been restored and/or a network outage event has been remedied. Automation engine server 110 may further communicate and/or consult with billing and AAA/HSS servers 137 to determine a charge for restoration-on-demand and further charge a customer account according to the service level agreement. The pricing and various charges related to the different services provided in the SLA, may be initially provided to the customer in a contract during the sales process of the network connection.

Automation engine 110 may establish a connection with a CPE (e.g., network device 180) via wired network 120. The automation engine server 110 may poll the network device 180. That is, the automation engine server 110 may periodically send queries to the network device 180 via the wired network 120 to determine the operational status of the device. This status information may be stored by the automation engine server 110.

In one implementation, a customer at CP 150 may receive network services, such as programs and data from remote server 140 via the network device 180 using wired network 120. Automation engine server 110 may monitor the quality of the network services, such as the bandwidth, packet delay of the streaming content and, further control the quality of the network services according to a SLA associated with the customer.

SLAs may include a customer's network subscription information (e.g., subscription to: the type of network connection, fail-over service, preferred quality of the network service, restoration period of a network connection). In one example, SLA may also include features and options related to the restoration-on-demand service, such as: bandwidth/capacity (data bundles), pre-paid subscription, quality of service, number of Transmission Control Protocol/Internet Protocol (TCP/IP) connections, etc. The SLA may further include application programs provided by or filtered from the restoration-on-demand service. For example, essential programs such as web browsing programs or business email may be provided in the restoration-on-demand service, however, non-critical programs, such as private email, Facebook®, online games may not be included in the restoration-on-demand service.

Automation engine server 110 may consult servers, such as AAA/HSS servers 137 to locate the respective SLA of a customer. Alternatively, automation engine server 110 may store SLAs for the customers and may retrieve the SLAs for monitoring and controlling of the network services.

Automation engine server 110 may be configured to detect an outage of the wired network connection 120. For example, automation engine server 110 may not receive a response to queries for status updates from the network device 180 via wired connection 120. As such, the automation engine server 110 may then determine that the wired network connection 120 has failed. In another implementation, the automation engine server 110 may receive indication, from the remote server 140, that the network services cannot be provided to UE 170 at the CP 150 through wired network connection 120. As such, automation engine server 110 may then determine that the wired network 120 is experiencing an outage.

Upon determining the outage of the wired network connection 120, automation engine server 110 may retrieve data relating to the SLA for the CP (e.g., by consulting AAA server or by retrieving the SLA from storage) to identify a restoration period (e.g., 4 hours) of the wired network connection 120.

In addition, automation engine server 110 may communicate with local and national emergency servers (e.g., national hurricane center) to determine if the likely cause of the outage is a weather event. Based on the cause of the outage, automation engine server 110 may further estimate the required time to restore the wired network connection 120. Alternatively, automation engine server 110 may consult a database (stored in the automation engine server 110) that stores history of multiple outages and their corresponding responding periods to determine the restoration period for a network outage. In one example, automation engine server 110 may determine that an outage of wired network connection 120 has likely been caused by a major hurricane, and the restoration period for such an event is 48-72 hours (i.e., longer than the restoration period provided in the SLA). In another example, automation engine server 110 may determine that an outage of wired network connection 120 has likely been caused by a lighting strike, and the restoration period for such an event is 1-2 hours (i.e., shorter than the restoration period provided in the SLA). Automation engine server 110 may be further configured to compare the restoration period for the wired network connection 120, provided in the SLA, with the actual repair period to update its statistics. Furthermore, automation engine server 110 may be configured to determine the extent of an outage and identify available and/or appropriate personnel for the repair of the network, as described below. In another example, automation engine server 110 may analyze the bit error rate (BER) of the connection to the network 120, the noise levels and/or the number of dropped packets, to determine the cause and the type of the outage. Yet in another example, the automation engine server 110 may determine that the network outage is due to power failure at the CP 150. In this example, the determination made by the automation engine server 110 may be based upon not receiving any response from the CPE 180 while polling the CPE 180 via both the wired network 120 and the backup network 130. In such a scenario, the network provider may not be responsible for any penalty charges for the network outage.

In some implementations, automation engine server 110 may be configured to generate trouble-tickets for the restoration of the wired network connection. Trouble-tickets may include the nature of the outage and the services needed to restore the network. In one example, the automation engine server 110 may send the trouble-tickets to other servers in order to notify the appropriate personnel about the network outage, so that restoration work is initiated immediately. Immediate dispatch of the appropriate personnel for restoring the network connection within the stipulated restoration period is particularly important to the network service provider, because, any delay in the restoration process (e.g., an amount of time beyond the restoration period provided in the SLA) may force the network provider to pay penalties to the customers.

Automation engine server 110 may be further configured to provide notification to the customer at the CP 150 about the outage of the wired network connection 120. The notification may include the nature of the outage, and the estimated repair time. Notification may be sent to the UE device 170. In one example, the notification may be send over the cellular network 130. Alternatively, Automation engine server 110 may send the notification over a network connection of another network service provider.

In another implementation, notification may be sent to an operator of a network operations control center at the CP 150. The operator may be an authorized personnel who is allowed to make decisions on behalf of the business at CP 150. The operator may or may not be a user or a customer of the CP 150. In one example, the notification may include a message indicating outage of the wired network connection 120 and may further include instructions on how to restore the services via the backup cellular connection 130 using CPE 180. The notification may be sent over the network control data plane.

Particularly, automation engine server 110 may be configured to provide various choices/options to the customer in relation to the restoration of the network services via the backup network connection (e.g., cellular network 130). In one implementation, the choices and options may be provided to the UE device 170.

For example, as discussed above, the automation engine server 110 may provide an option of restoration-on-demand, to the customer at the CP 150. Restoration-on-demand may be provided upon determining that the restoration period of the wired network connection 120 is within the restoration period provided in the SLA. For example, as discussed above, for an outage, the restoration time of the wired network connection may be 1-2 hours and the restoration period provided in the SLA may be 4 hours. Automation engine server 110 may then provide the option to the customer to resume the network services (i.e., the services that the customer was receiving using the wired connection 120 prior to the outage) via the cellular network connection 139 (i.e., the backup network connection). In one example, automation engine server 110 may check the availability and bandwidth of the connection 139 to the wireless network 130 at the CP 150, prior to providing the restoration-on-demand option.

Automation engine server 110 may be configured to receive responses from the customer at the CP 150. In one example, a customer respond to the request to provide the restoration-on-demand service using the UE device 170. UE device 170 may have applications to make selections and send the response to the selections to the automation engine server 110. For example, the customer may select to pay for the restoration-on-demand option and send the response to the automation engine server 110.

As described above, the request sent to the customer and response received from the customer related to the restoration-on-demand service may traverse the network control data plane. Moreover, prior to sending the request to the customer, the automation engine server 110 may poll the CPE 180 via the cellular network connection 139, over the network control data plane, to ensure that the cellular connection is functional. Once the customer selects the option of the restoration-on-demand service, automation engine server 110 enables the user data plane, for example, by establishing a session between the CPE 180 and the remote server 140 and further processes the billing related to the restoration-on-demand service.

In another example, the customer may purchase the restoration-on-demand service from a location such at a store.

The example automation engine server 110 processes the selections received from the customers. For example, if the customer selects to buy the restoration-on-demand service, the automation engine server 110 may then resume the network services by switching the CPE 180 to the cellular network connection 139. Resuming the network services may include the automation engine server 110 automatically enabling the M2M interface of the network device 180, so that the customer may resume receiving the network services using the cellular network connection 139. In another example, automation engine server 110 may process the selection of buying the restoration-on-demand service, and provide a notification to the customer at the CP 150 to manually enable the M2M interface of the network device 180 (e.g., by actuating the switch 160). Moreover, the network device 180 may have a text warning stating that actuating the switch 160 initiates a wireless restoration service and that actuating the switch indicates the user accepts the charges for this restoration.

In yet another example, upon processing the selection of the restoration-on-demand service, the automation engine server 110 may communicate with the billing server (not shown) to charge the account of the customer for using the cellular network connection 139 for the network services, only during the restoration period provided in the SLA. If the repair period lasts longer than the restoration period, automation engine server 110 may not charge for any additional time beyond the restoration period in the SLA. For example, restoration period provided in the SLA is 4 hours, and the outage period of the wired network connection 120 is 6 hours, the automation engine server 110 may charge the customer account only for the first 4 hours, and not for the additional 2 hours of network outage.

Automation engine server 110 may be configured to detect whether wired connection 120 has been restored and to disable the M2M interface of the network device 180, once the wired network connection 120 is restored. Normal network services may then be provided by the wired network connection 120 at the CP 150.

In another example, automation engine server 110 may be further configured to determine that the outage period of the first network connection 120 is beyond the restoration period of the SLA and that the customer has not selected the restoration-on-demand service. However, to avoid penalty charges, a provider of services over the first network connection 120 may have configured automation engine server 110 to automatically resume the network services via the cellular network connection 139 if a maximum restoration period, provided in the SLA, has expired or is about to expire. In this example, automation engine server 110 may not charge the customer's billing account for usage of the cellular network connection 139, for the time that is beyond the restoration period stipulated in the SLA.

In one implementation, the automation engine server 110 may be configured to poll the CPE 180 via the wired network 120 every 60 seconds and the restoration period provided in the SLA may be 4 hours. In this implementation, if the automation engine server 110 polls for 3 hours and 57 minutes during the outage of the wired network 120, and does not receive any response from the CPE 180 during that period, the automation engine server 110 may enable the user data plane of the cellular network connection 139. Hence, the calculation of the outage period of the wired network 120 may be based on the polling period of the wired network 120. Moreover, business rules and policies that are set forth by a network administrator of the network provider concerning the calculated outage period and SLA, may be consulted by the automation engine server 110 to enable and/or disable billing of the customer for the appropriate usage of the network resources.

It is contemplated that, apart that the customer being given a choice of whether to restore the service immediately upon a service outage, an additional benefit of the restoration-on-demand is that there will be fewer breaches of the SLA commitment to the customer after restoration period has passed. It is further contemplated that this will have a positive effect on the overall customer satisfaction.

Yet in another example, the automation engine server 110 may be configured to determine that a customer has pre-selected restoration-on-demand services as a fail-over service. In such a scenario, during an outage of the wired network connection 120, the automation engine server 110 may automatically resume the network services by switching to the cellular network connection 139 by automatically enabling the M2M interface of the network device 180.

Figure 3A:
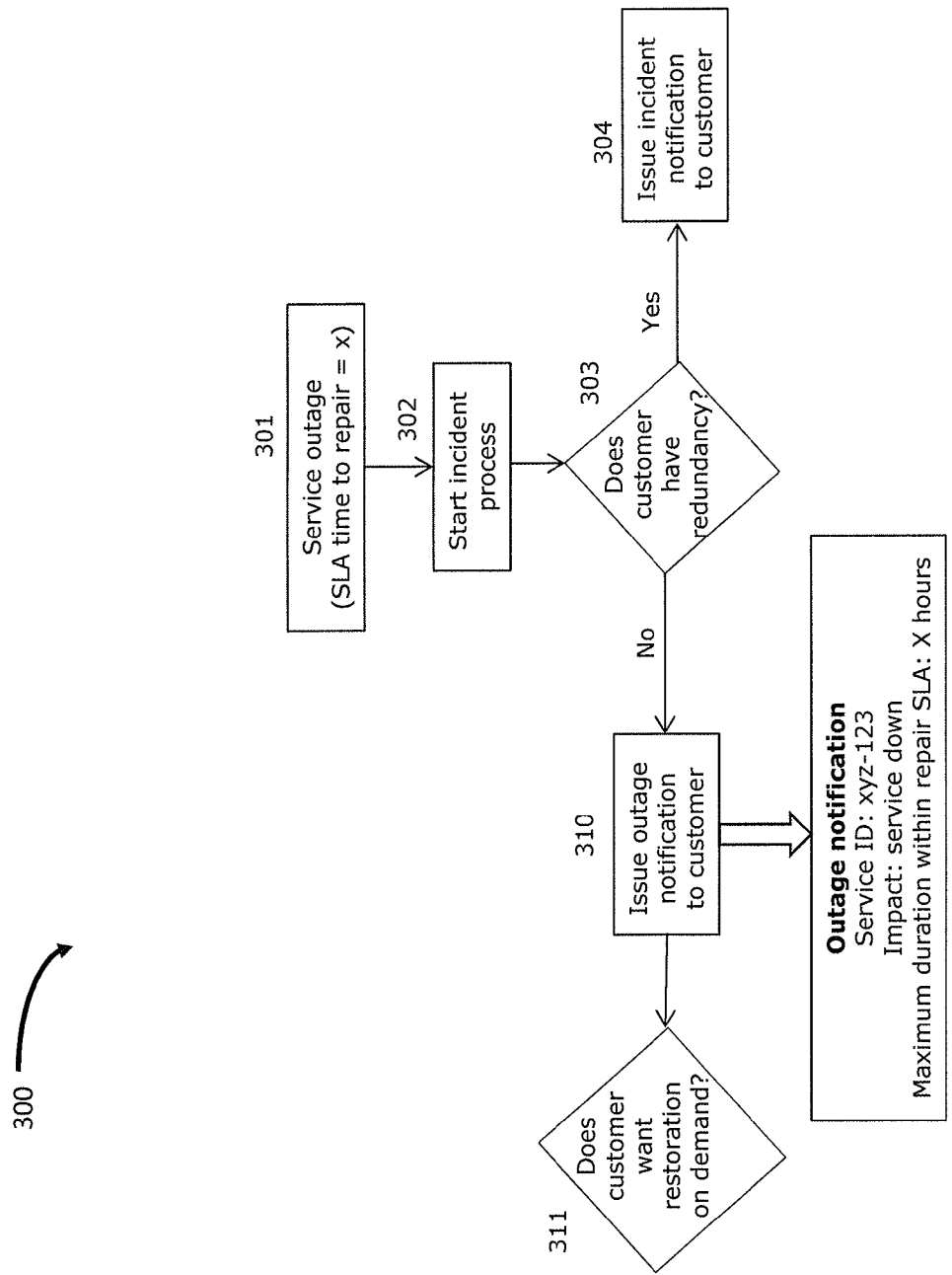
FIG. 3A is a flow-chart diagram of example processes executed by a network server to restore network services according to one or more implementations described herein.

FIG. 3A is a high level flow chart 300 that describes various choices that may be provided to a customer in relation to the restoration-on-demand service and the example processes that are executed by the automation engine server 110 in response to the selections made by the customer, according to one or more implementations described herein.

Figure 3B:
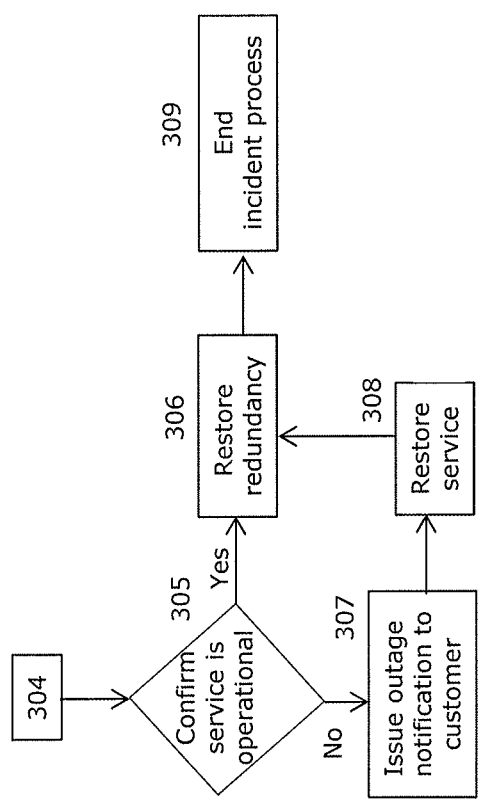
FIG. 3B is a flow-chart diagram that illustrates the steps executed by a network server when a customer has pre-subscribed to an automatic fail-over service according to one or more implementations described herein.
Figure 3C:
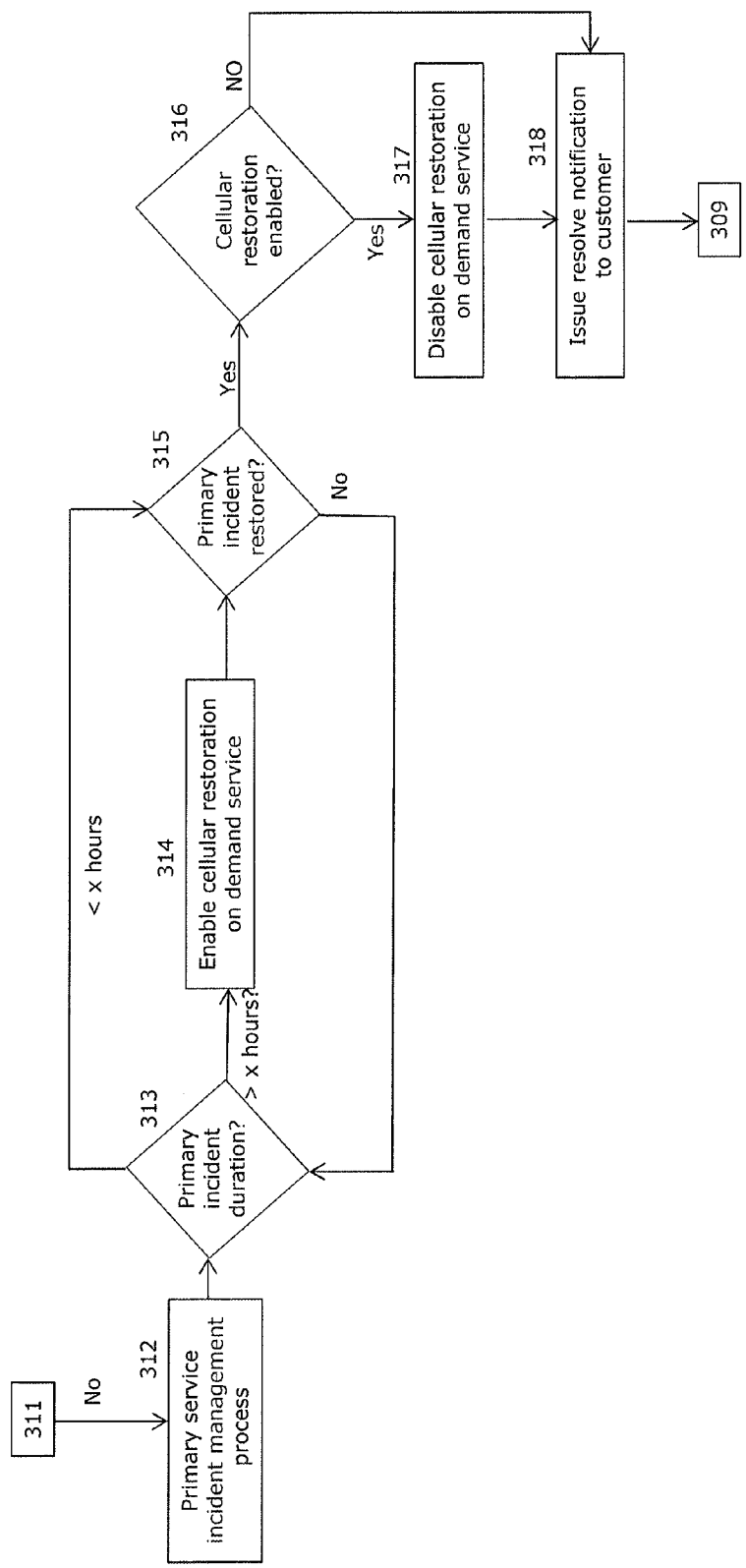
FIG. 3C is a flow-chart diagram that describes the steps executed by a network server when a customer does not purchase restoration-on-demand service according to one or more implementations described herein.
Figure 3D:
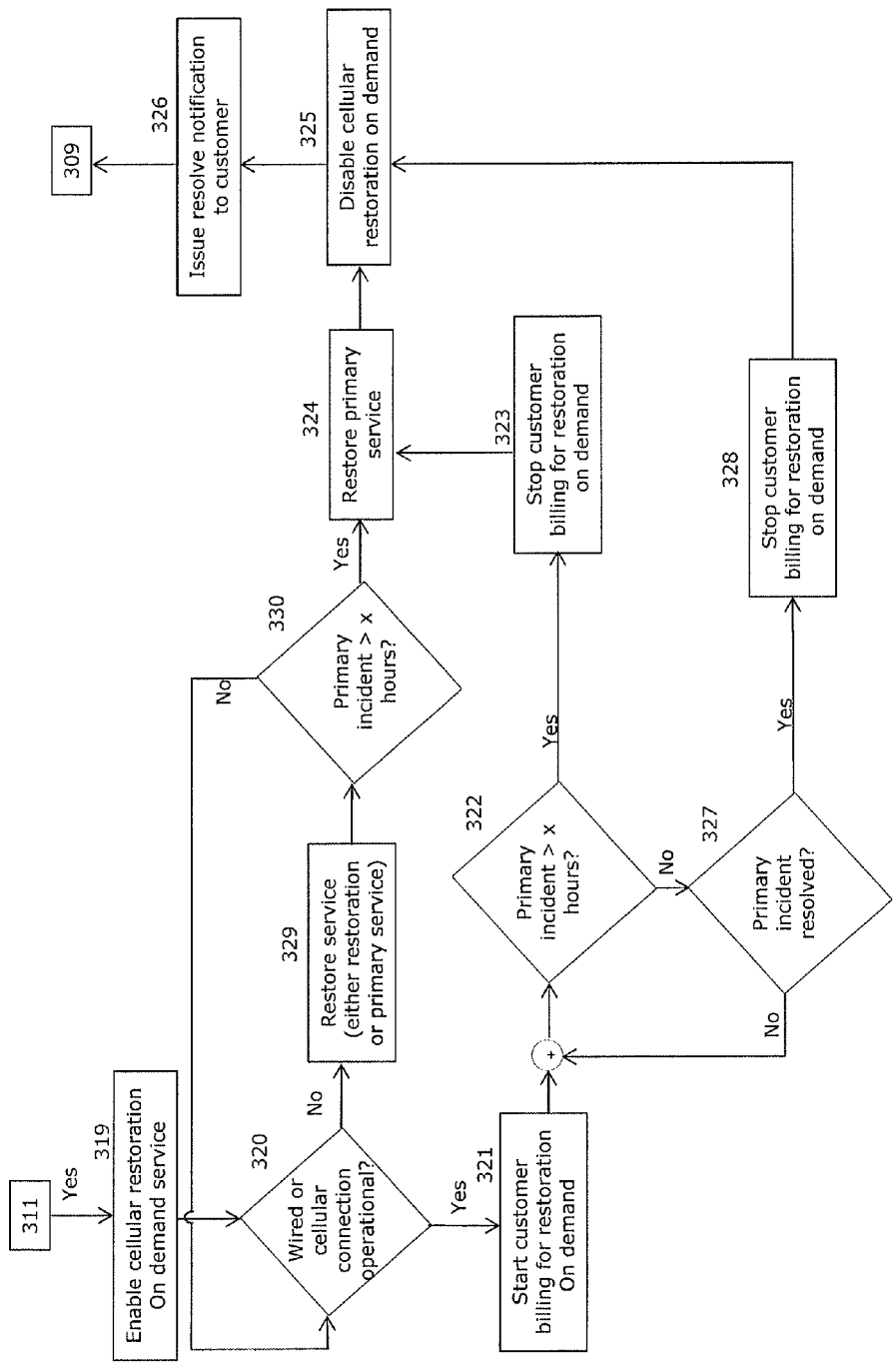
FIG. 3D is a flow-chart diagram that illustrates the steps executed by a network server when a customer purchases restoration-on-demand service upon receiving the option to purchase the service according to one or more implementations described herein.

In detail, FIG. 3B discloses example steps performed by the automation engine server 110 when a customer has pre-subscribed to an automatic fail-over service. In another example, FIG. 3C illustrates the steps executed by the automation engine server 110 when the customer receives the option to purchase the restoration-on-demand service and decides not to purchase the service. Yet in another example, FIG. 3D illustrates the steps performed by the automation engine server 110 when the customer decides to buy the restoration-on-demand service upon receiving the option to purchase the service.

With reference to FIG. 3A, at block 301, the automation engine server 110 may determine that the time to restore the wired network connection in the SLA is, for example, 4 hours (e.g., x=4 in FIG. 3). At block 302, the automation engine server of the network service provider may start the incident process including generating a trouble ticket. At block 303, the automation engine server 110 may determine whether the customer has subscribed to redundancy. To do this, the automation engine server 110 may consult the AAA/HSS server 137 to check the customer's profile or SLA for such a subscription. If the customer has subscribed to a redundancy service, at block 304, automation engine server 110 may issue a notification related to the outage of the wired network connection 120 (e.g., causes for the outage and estimated time to restore the wired connection) to the customer. Further steps that are performed by the automation engine server 110 in relation to the pre-subscription of the automatic fail-over are described with reference to FIG. 3B.

Alternatively, at block 303, automation engine server 110 may determine that the customer has not purchased network redundancy. As discussed above, automation engine server 110 may perform the determination upon consulting AAA/HSS server that stores profile and SLA information of the customer.

At block 310, automation engine server 110 may then generate and send a notification related to the outage of the wired network connection 120 to the customer. For example, the notification may include a service identification (e.g., a code that identifies repair of the wired network 120), the nature of the outage (e.g., the types of services that are down), and a repair time as disclosed in SLA (e.g., 4 hours to restore the network services by repairing the wired network). In one example, the repair time may be indefinite if the outage was caused by a force majeure event. The notification may be sent to the user of the UE device 170 or the customer to inform him of the estimated time to repair the wired connection.

Finally, at block 311, automation engine server 110 may provide the customer, via the UE device 170, with a choice to purchase restoration-on-demand service. In another example, the automation engine server 110 may provide the choice to an operator of a network operations control center at the CP 150.

As mentioned above, FIG. 3B relates to the steps performed by the automation engine server 110 upon determining that the customer has pre-subscribed to an automatic fail-over service at step 304 in FIG. 3A. At block 305, automation engine server 110 may determine whether the service is operational. For example, the automation engine server 110 may check whether the wired connection 120 or the cellular network connection 139 is operational, or both of the network connections are operational. Particularly, the determination may include verifying whether the user data plane is enabled via at least one of the network connections, after checking the status of the cellular network connection 139 and the wired network connection 120. At block 306, the automation engine 110 may initiate the restoration process of either the cellular connection or the wired network connection in order to restore redundancy (i.e., the restoration of the secondary network connection while the primary network connection is available). For example, the automation engine server 110 may initiate the restoration process of the cellular network connection 139, upon determining that the cellular network connection is out of service while the wired network connection 120 is still operational. In another example, the automation engine 110 determines an outage of the wired network connection 120 and initiates the restoration process of the wired network connection 120 while the cellular connection 139 is still operational.

In one implementation, automation engine server 110 may determine that both the cellular and the wired network connections are not operational and the user data service may not be available via either of the network connections. As such, at block 307, the automation engine server 110 may send notification of the outage (i.e., a complete outage when both of the cellular network connection and the wired network connections are not operational) to the customer, via an operational communication connection such as a PSTN connection or another cellular connection that is independent of the cellular network 139. It is contemplated that to ensure the availability of both the network connections, the automation engine server 110 may poll the network connections while at least one of the network connections is operational, to identify and fix problems with the non-operational connection, before it is needed.

At block 308, automation engine server 110 may begin to restore the primary network service by either restoring the cellular connection or the wired network connection (e.g., by sending trouble ticket to the appropriate personnel). The automation engine server 110 may then further restore the redundancy service (i.e., the second network connection), as described above with reference to block 306. At block 309, the automation engine server 110 may end the incident that was started at block 302.

Further with reference to FIG. 3C, and as disclosed above, at block 311, automation engine server 110 may provide the customer, via the UE device 170, with a choice to purchase restoration-on-demand service. In one example, the customer decides not to purchase the restoration-on-demand service and sends the response back to the automation engine server 110. At block 312, automation engine server 110 receives and processes the customer's response to determine that the customer will not receive any network service during the repair period or restoration period of the wired network 120 (e.g., 4 hours, as disclosed in SLA).

During the repair period of the wired network 120, automation engine server 110 may periodically (e.g., every 10 minutes) poll the network device 180 through the wired network 120. For example, at block 313, the server 110 may poll the network device 180 beyond the repair period of 4 hours. The automation engine server 110 may determine that the repair time of the wired network has exceeded the restoring time as promised in the SLA. As such, at block 314, automation engine server 110 automatically enables the cellular network connection 139 (i.e., restoration-on-demand service) for network services at the CP 150. As described above, the enabling the cellular connection 139 includes automatically enabling the M2M interface of the network device 180, or alternatively, sending a notification to the customer to manually engage the M2M interface of the CPE 180 using the switch 160. During this step, automation engine server 110 also notifies the billing server not to charge the customer's account for the restoration-on-demand service. This may help the network service provider from paying penalties for not providing network services beyond the repair time of the wired network 120.

Alternatively, at block 313, automation engine server 110 may determine that the repair time of the wired network is still within the restore period of the SLA (i.e., within the 4 hour limit). As such, automation engine server 110 may not enable the restoration-on-demand service for the customer.

At block 315, automation engine server 110 again checks whether the wired network connection 120 has been restored. If the wired network connection 120 is still not restored, the automation engine server 110 branches back to determining the duration of the outage at block 313.

As discussed above, at block 315 the server 110 may check whether the wired network connection 120 has been restored. If the wired network connection 120 has been restored, automation engine server 110 may further check, at block 316, if the cellular network connection 139 has been enabled. At block 317, automation engine server 110 may disable the cellular network connection 139 and further issue a notification to the customer related to restoration of the wired network connection 120 at block 318.

Alternatively, at block 316, automation engine server 110 may determine that the cellular connection 139 was not enabled. This may be because the wired network was restored within the SLA repair time and the customer did not purchase the restoration-on-demand service. As such, the automation engine server 110 may then issue the notification, to the customer, related to the restoration of the wired network connection 120 at block 318 and the process may end at block 309, as discussed above.

Further with reference to FIG. 3D, in one example, at step 311 upon receiving the option, the customer may select to purchase the restoration-on-demand service while the wired network connection is down.

As disclosed above, at block 311, the example automation engine server 110 receives the response from the customer and, at block 319, enables the cellular network connection 139 at CP 150.

At block 320, similarly to block 305, the automation engine server 110 may determine whether the network service is operational via at least the wired connection 120 or the cellular network connection 139. Particularly, the determination includes whether the user data plane is enabled via at least one of the network connections, after checking the status of the cellular network connection 139 and the wired network connection 120. In one example, the automation engine server 110 checks the status of the cellular network connection 139. Upon determining that the cellular network connection is operational, automation engine server 110, at block 321, communicates with the billing server to charge the customer's account for the restoration-on-demand service.

Similarly to block 313, at block 322, the automation engine server 110 determines whether the repair time for the wired connection is within or outside the SLA restore time. If it is determined that the repair time of the wired connection has exceeded the restore time specified in SLA, the automation engine server 110, at block 323, may notify the billing server to stop charging the customer's account for the restoration-on-demand service that started at block 321.

At block 324, the process is described which restores the wired network connection (e.g., upon generating trouble ticket and notifying the field staff). Similarly to blocks 317 and 318, automation engine server 110 then disables the cellular network connection and issues a notification to the customer, at blocks 324 and 325, that the wired network connection, has been restored. The automation engine server 110 may end processing at block 309.

In another example, at block 322, automation engine server 110 may determine that the repair time for the wired network connection is within the restore time specified in the SLA and that the outage of the wired network connection has been resolved (block 327). Automation engine server 110 may then request the billing server to stop charging the customer's account for the restoration-on-demand service that started at block 328 and end the process following the blocks 325, 326 and 309, as described above.

Alternatively, at block 327, the automation engine server may determine that the outage of the wired network connection 120 is not fixed and the repair time is still within the restoring period in SLA, the process may then simply go back to block 322.

It is contemplated that a primary service may be the service that is provided through the primary wired network connection 120 and a secondary service may be the service that is provided by the secondary cellular network connection 139. The secondary service may be enabled, for example, when the primary service fails, or based on various other scenarios. However, if the secondary service fails, the primary service may be restored via the primary connection.

In one implementation, at block 320, the automation engine server 110 may determine that both the cellular network connection 139 and the wired network connection 120 are not operational and may initiate the restoration of at least one of the network connections. For example, the automation engine server 110 may start the restoration process of the cellular network and restore the cellular network (e.g., by generating trouble ticket and sending notification to the appropriate personnel) (block 329). Alternatively, the automation engine server 110 may restore the wired network connection 120. As described above, when the connection is restored, the automation engine server 110 enables the user data plane via at least one of the network connections for the network services.

Similarly to the block 322, at block 330, the automation engine server 110 may determine whether the repair time of the wired network is within or beyond the restore period in SLA. If the repair time is within the restore period, the process may loop back to block 320 and the time exceeds the restore period the process continues to block 324, as discussed above.

It is noted that example programs shown in FIGS. 3A-3D may be implemented in many different forms of software, firmware, and hardware in the implementations illustrated in the figures. The actual software code or specialized control hardware used to implement these aspects should not be construed as limiting. Thus, the operation and behavior of the aspects are described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Aspects of the methods of providing restoration-on-demand service described above may be implemented in hardware or software. Program aspects of the technology may be thought of as "products" or "articles of manufacture" typically in the form of executable code and/or associated data that is carried on or embodied in non-transitory machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from the memory of one computer or processor into another. As used herein, unless restricted to non-transitory, tangible "storage" media, terms such as computer or machine "readable medium" refer to any such medium that participates in providing instructions to a processor for execution.

Non-volatile storage media include, for example, optical or magnetic disks, such as any of the storage devices in any computer(s) or the like, such as may be used to implement the functions described above. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM, an EPROM, a FLASH-EPROM, any other memory chip or cartridge transporting data or instructions, or any other medium from which a computer can read programming code and/or data. Many of these forms of computer readable media may be involved in carrying one or more sequences of one or more instructions to a processor for execution.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server comprising:
a memory to store instructions; and
a processor operably coupled to a network interface that supports a first network connection via a wired network and a second network connection via a wireless network, the processor configured to execute the instructions to:
establish the first network connection with a customer premise equipment (CPE) installed at a customer premise (CP);
control, based on establishing the first network connection, delivery of services via the first network connection to the CPE;
monitor, based on controlling the delivery of services, the first network connection;
detect, based on monitoring the first network connection, a first outage of the first network connection;
provide, based on detecting the first outage of the first network connection, an option to use the second network connection with the wireless network for the delivery of services during the first outage of the first network connection;
receive, based on providing the option, a first response;
cause, if the first response indicates acceptance of the option, the CPE to switch the delivery of services to the second network connection;
establish, based on causing the CPE to switch the delivery of services, the second network connection with the CPE via the wireless network;
determine a cause of the first outage;
estimate, based on determining the cause, a duration of the first outage; and
issue a notification related to the first outage to a user associated with the CPE,
the notification indicating the estimated duration of the first outage,
a billing account of the user being charged for the user receiving restoration services, using the second network connection, during a particular period of time; and
the billing account of the user not being charged for the user receiving the restoration services, using the second network connection, during a period of time that exceeds the particular period of time, information identifying the particular period of time being provided in a service level agreement (SLA) associated with the user.

2. The server of claim 1, where the processor, when monitoring the first network connection of the wired network, is to:
periodically poll the CPE via the first network connection.

3. The server of claim 1, where the processor, when causing the CPE to switch the delivery of services, is to:
cause the CPE to enable a machine to machine (M2M) interface in the CPE.

4. The server of claim 1, where the processor is further to:
determine, based on estimating the duration of the first outage, that an estimated repair time for restoring the first network connection is within the particular period of time.

5. The server of claim 1, where the processor is further to:
send a request to a billing server to charge the billing account of the user for the user receiving the restoration services during the particular period of time, and
send another request to the billing server to stop charging the billing account for the user receiving the restoration services when a repair time, associated with the first outage, exceeds the particular period of time.

6. A non-transitory computer-readable medium storing instructions, the instructions comprising:
one or more instructions that, when executed by one or more processors of a server, cause the one or more processors of the server to:
establish a first network connection with a customer premise equipment (CPE) installed at a customer premise (CP);
control, based on establishing the first network connection, delivery of services to the CPE via the first network connection;
monitor, based on controlling the delivery of services, the first network connection;
detect, based on monitoring the first network connection, a first outage of the first network connection;
provide, based on detecting the first outage of the first network connection, an option to use a second network connection with a second network for the delivery of services during the first outage of the first network connection;
receive, based on providing the option, a first response;
cause, if the first response indicates acceptance of the option, the CPE to switch to the second network connection;
establish, based on causing the CPE to switch the delivery of services, the second network connection with the CPE via the second network;
determine a cause of the first outage;
estimate, based on determining the cause, a duration of the first outage; and
issue a notification related to the first outage to a user associated with the CPE,
the notification indicating the estimated duration of the first outage,
a billing account of the user being charged for the user receiving restoration services, using the second network connection, during a particular period of time; and
the billing account of the user not being charged for the user receiving the restoration services, using the second network connection, during a period of time that exceeds the particular period of time, information identifying the particular period of time being provided in a service level agreement (SLA) associated with the user.

7. The non-transitory computer readable medium of claim 6, where the one or more instructions, when executed by the one or more processors of the server to monitor the first network connection, cause the one or more processors of the server to:
    periodically poll the CPE via the first network connection.

8. The non-transitory computer readable medium of claim 6, where the one or more instructions, that cause the one or more processors of the server to cause the CPE to switch to the second network connection, cause the one or more processors of the server to:
    cause the CPE to enable a machine to machine (M2M) interface in the CPE.

9. The non-transitory computer readable medium of claim 6, where the one or more instructions, when executed by the one or more processors of the server further cause the one or more processors of the server to:
    determine, based on estimating the duration of the first outage, that an estimated repair time for restoring the first network connection is within the particular period of time.

10. The non-transitory computer readable medium of claim 6, where the one or more instructions, when executed by the one or more processors of the server, further cause the one or more processors of the server to:
    send a request to a billing server to charge the billing account of the user for the user receiving the restoration services during the particular period of time, and
    send another request to the billing server to stop charging the billing account for the user receiving the restoration services when a repair time, associated with the first outage, exceeds the particular period of time.

11. The non-transitory computer readable medium of claim 6, where the one or more instructions, when executed by the one or more processors of the server, further cause the one or more processors of the server to:
    detect a second outage of the first network connection, and provide, based on detecting the second outage, a second option for using the second network connection for the delivery of services during the second outage of the first network connection by purchasing restoration-on-demand service.

12. The non-transitory computer readable medium of claim 6, where the one or more instructions, when executed by the one or more processors of the server, further cause the one or more processors of the server to:
    receive a response indicating a selection for not resuming the delivery of services over the second network connection;
    determine, based on estimating the duration of the first outage, that a repair time for restoring the first network connection does not satisfy time information provided in the SLA;
    cause, based on determining that the repair time for restoring the first network connection does not satisfy the time information, the CPE to switch to the second network connection; and
    establish, based on causing the CPE to switch to the second network connection, the second network connection with the CPE via the second network.

13. The non-transitory computer readable medium of claim 6, where the one or more instructions, when executed by the one or more processors of the server, further cause the one or more processors of the server to:
    detect a third outage of the first network connection and determine whether an option to resume the delivery of services over the second network connection for an occurrence of the third outage of the first network connection is selected;
    cause, based on detecting the third outage, the CPE to switch to the second network connection; and
    establish, based on causing the CPE to switch to the second network connection, the second network connection with the CPE via the second network.

14. A method comprising:
    establishing, by a server, a first network connection with a customer premise equipment (CPE) installed at a customer premise (CP),
        the server including at least one network interface to support the first network connection via a wired network and to support a second network connection via a wireless network;
    controlling, by the server and based on establishing the first network connection, delivery of services via the first network connection to the CPE;
    monitoring, by the server and based on controlling the delivery of services, the first network connection;
    detecting, by the server and based on monitoring the first network connection, a first outage of the first network connection;
    providing, by the server and based on detecting the first outage of the first network connection, an option to use the second network connection with the wireless network, for the delivery of services during the first outage of the first network connection;
    receiving, by the server and based on providing the option, a first response;
    causing, by the server and if the first response indicates acceptance of the option, the CPE to switch the delivery of services to the second network connection;
    establishing, by the server and based on causing the CPE to switch the delivery of services, the second network connection with the CPE via the wireless network;
    determining, by the server, a cause of the first outage;
    estimating, by the server and based on determining the cause, a duration of the first outage; and
    issuing, by the server, a notification related to the first outage to a user associated with the CPE,
        the notification indicating the estimated duration of the first outage,
        a billing account of the user being charged for the user receiving restoration services, using the second network connection, during a particular period of time; and
        the billing account of the user not being charged for the user receiving the restoration services, using the second network connection, during a period of time that exceeds the particular period of time,
            information identifying the particular period of time being provided in a service level agreement (SLA) associated with the user.

15. The method of claim 14, where monitoring the first network connection of the wired network includes:
    periodically polling the CPE via the first network connection.

16. The method of claim 14, where causing the CPE to switch the delivery of services includes:
    causing the CPE to enable a machine to machine (M2M) interface in the CPE.

17. The method of claim 14, further comprising:
    determining, based on estimating the duration of the first outage, that an estimated repair time for restoring the first network connection is within the particular period of time.

18. The method of claim 14, further comprising:

sending a request to a billing server to charge the billing account of the user for the user receiving the restoration services during the particular period of time, and sending another request to the billing server to stop charging the billing account for the user receiving the restoration services when a repair time, associated with the first outage, exceeds the particular period of time.

19. The method of claim 14, further comprising:

detecting a second outage of the first network connection, and providing, based on detecting the second outage, a second option for using the second network connection for the delivery of services during the second outage of the first network connection by purchasing restoration-on-demand service.

20. The method of claim 14, further comprising:

receiving a response indicating a selection for not resuming the delivery of services over the second network connection;

determining, based on estimating the duration of the first outage, that a repair time for restoring the first network connection does not satisfy time information provided in the SLA;

causing, based on determining that the repair time for restoring the first network connection does not satisfy the time information, the CPE to switch to the second network connection; and establishing, based on causing the CPE to switch to the second network connection, the second network connection with the CPE via the second network.

* * * * *